United States Patent [19]

Grossman et al.

[11] Patent Number: 5,230,039
[45] Date of Patent: Jul. 20, 1993

[54] TEXTURE RANGE CONTROLS FOR IMPROVED TEXTURE MAPPING

[75] Inventors: Mark S. Grossman, Mountain View; Kurt B. Akeley, Union City; Robert A. Drebin, Berkeley, all of Calif.

[73] Assignee: Silicon Graphics, Inc., Mountain View, Calif.

[21] Appl. No.: 657,090

[22] Filed: Feb. 19, 1991

[51] Int. Cl.⁵ .............................. G06F 15/62
[52] U.S. Cl. ........................................ 395/130
[58] Field of Search ............... 395/125, 127, 130, 134

[56] References Cited

U.S. PATENT DOCUMENTS

| | | | |
|---|---|---|---|
| 4,412,296 | 10/1983 | Taylor | 395/134 |
| 4,543,645 | 9/1985 | Vigarié395 | 130/ |
| 4,974,177 | 11/1990 | Nishiguchi | 395/125 |

OTHER PUBLICATIONS

Heckbert, Paul S., "Survey of Texture Mapping", Graphics Interface '86/Vision Interface '86, pp. 207-212 (1986).
Williams, Lance, "Pyramidal Parametrics", Computer Graphics, vol. 17, No. 3, pp. 1-11, (Jul. 1983).

Primary Examiner—Mark K. Zimmerman
Attorney, Agent, or Firm—Blakely, Sokoloff, Taylor & Zafman

[57] ABSTRACT

A graphical display system and process for specifying and controlling a display range in which a specified form of texture mapping is applied or suppressed. Object data from a host computer is processed by four pipelined graphics subsystems before being displayed on a display screen. These graphics subsystems include: 1) a Geometry Subsystem, 2) a Scan Conversion Subsystem, 3) a Raster Subsystem, and 4) a Display Subsystem. Span Processors within the Scan Conversion Subsystem manipulate pixel coordinates in order to handle situations when coordinates are located out of range of a texture map. Processing logic and hardware registers located within each Span Processor implement two texture modes for handling out-of-range coordinates. First, a mask and comparison register is provided to hold a value specifying a selected range in which texture is applied to a pixel. If a pixel is outside the specified range, texture application is suppressed. Secondly, logic is provided for determining if the input pixel coordinate is within range of the texture map. If the input coordinate is out of range and positive, the coordinate is set to a value corresponding to the most positive border of the texture map. If the input coordinate is out of range and negative, the coordinate is set to a value corresponding to the least positive border of the texture map. The processed coordinate is then output to one of a plurality of Image Engines.

22 Claims, 7 Drawing Sheets

TEXTURE RANGE CONTROLS FOR IMPROVED TEXTURE MAPPING

FIELD OF THE INVENTION

The present invention relates to the display of images on a computer display screen. Specifically, the present invention relates to the computer generation and display of multi-dimensional images with texture.

BACKGROUND OF THE INVENTION

Computer graphics systems are commonly used for displaying graphical objects on a display screen. These graphical objects include points, lines, polygons, and three dimensional solid objects. Using techniques well known in the art, color and surface details can be added to areas and surfaces of objects. One particularly useful technique for adding surface detail to areas or surfaces is texture mapping. Using texture mapping, a pattern image or texture map is combined with an area or surface of an object thereby producing a modified object with the added detail of the texture map. For example, given a flat black solid cube and a texture map defining a wood grain pattern, the texture mapping technique can be used to map the wood grain pattern onto the cube thereby producing a cube that appears to be made of wood. The texture mapping technique is particularly useful as surface detail becomes finer and more intricate thereby rendering the use of geometric primitives less practical.

Texture mapping operates by applying color or visual attributes of point elements (texels) of a texture map to corresponding point elements (pixels) of an object on a display screen. As long as the coordinate system of the texture map is positioned or in some way related to the coordinate system of the object being textured, the association between texels and pixels is well defined. A problem, however is present in prior art systems when an object or portion of an object extends beyond the coordinate range of the texture map. This may occur if the scaling between the texture map and the object does not allow coverage of the entire surface of the object by the texture map. In this situation, the object is out of range of the texture map and the association between texels and pixels is no longer well defined. Many prior art systems handle the out-of-range situation by simply repeating the texture map pattern if an out-of-range condition is encountered. In these systems, the texture map space wraps around in both dimensions thereby creating an endlessly repeating texture map. In many situations, however a repeated texture pattern is not desirable. For example, a product manufacturer may want to visualize a packaging label as it would appear on a proposed product container. In this case, a repeated label pattern (i.e. texture) as provided by prior art systems would not be a realistic portrayal of the actual finished product. In another example, a texture map comprising far more texels than can be conveniently stored in mapping hardware, such as photo-derived terrain, is used for applying texture to a ground surface. A better method is needed to extend the coordinate range of the texture mapped to such an object.

It is therefore an object of the present invention to provide a technique for applying a texture to an object where the coordinates for the object are outside the coordinate range of an associated texture map. It is further an object of the present invention to provide a means for suppressing the application of texture to an object for specified object coordinate range.

SUMMARY OF THE INVENTION

The present invention provides a means and a method for specifying and controlling a display range in which a specified form of texture mapping is applied or suppressed. Object data from a host computer is processed by four pipelined graphics subsystems before being displayed on a display screen. These graphics subsystems include: 1) a Geometry Subsystem, 2) a Scan Conversion Subsystem, 3) a Raster Subsystem, and 4) a Display Subsystem. The Geometry Subsystem receives graphical data from the host computer and converts it to screen-space data. The Scan Conversion Subsystem then breaks down points, lines, polygons, and meshes thereby producing pixel data. This pixel data is sent to the Raster Subsystem where a Z-buffer removes hidden surfaces. The Raster Subsystem also performs various blending and texturing functions on a pixel-by-pixel basis as the pixels are written to image bit-planes, or a frame buffer. Finally, the Display Subsystem reads the frame buffer and displays the image on a color monitor.

During the scan conversion process, texture coordinates are iterated with the other polygon parameters at each screen pixel. The twenty or forty parallel Image Engines (IE) simultaneously texture a polygon and blend it into the display. Prior to processing by the IEs, Span Processors manipulate pixel coordinates in order to handle sitations when coordinates are located out of range of a texture map.

Processing logic and hardware registers located within each Span Processor implement two texture modes for handling out-of-range coordinates. First, a mask and comparison register is provided to hold a value specifying a selected range in which texture is applied to a pixel. If a pixel is outside the specified range, texture application is suppressed. Secondly, logic is provided for determining if the input pixel coordinate is within range of the texture map. If the input coordinate is out of range and positive, the coordinate is set to a value corresponding to the most positive border of the texture map. If the input coordinate is out of range and negative, the coordinate is set to a value corresponding to the least positive border of the texture map. The processed coordinate is then output to one of a plurality of Image Engines.

DETAILED DESCRIPTION OF THE PREFERRED EMBODIMENT

The present invention provides a means and a method for specifying and controlling a display range in which a specified form of texture mapping is applied or suppressed. In the following description, numerous specific details are set forth in order to provide a thorough understanding of the present invention. It will be apparent, however, to one of ordinary skill in the art that the present invention may be practiced without these specific details. In other instances, well known structures and techniques have not been shown in detail in order not to unnecessarily obscure the present invention.

The present invention provides a means and a method for specifying and controlling a display range in which a specified form of texture mapping is applied or suppressed. In one mode, a texture coordinate is set (clamped) to a texture map border value if the image pixel is located outside a specified coordinate range. In a second mode, texture mapping is suppressed if the image pixel is located in a specified coordinate range.

A host CPU of the preferred embodiment provides the graphics subsystem with the visual description of 3D objects. This visual description takes the form of drawing commands and world coordinate vertex data. The description describes the object's geometric position, color, and surface normal vectors used for complex lighting calculations. The graphics architecture of the present invention performs transformations and other graphics operations to calculate specific pixel values for each of the 1.3 million pixels on a 1280×1024 high-resolution display. It will be apparent to those skilled in the art that equivalent systems may be implemented with a different number of pixels on the display system. Object data from the host computer is processed by four pipelined graphics subsystems before being displayed on the screen: 1) a Geometry Subsystem, 2) a Scan Conversion Subsystem, 3) a Raster Subsystem, and 4) a Display Subsystem.

The Geometry Subsystem receives the 32-bit or 64-bit graphical data from the host computer and converts it to screen-space data. Screen-space data defines an object's position in a screen coordinate system corresponding to the visible plane of the display monitor screen. The Scan Conversion Subsystem then breaks down points, lines, polygons, and meshes thereby producing pixel data. This pixel data is sent to the Raster Subsystem where a Z-buffer removes hidden surfaces. The Raster Subsystem also performs various blending and texturing functions on a pixel-by-pixel basis as the pixels are written to image bit-planes, or a frame buffer. Finally, the Display Subsystem reads the frame buffer and displays the image on a color monitor.

Parallelism is exploited extensively throughout the present invention graphics architecture. The single-instruction, multiple-data (SIMD) organization of the geometric subsystem allows up to four primitives to be processed in each of two pipeline elements. The MIMD organization of the scan conversion and raster subsystem allows up to 200 million pixels to be processed per second.

The graphics subsystem of the present invention uses one-megabit video random access memory (VRAMs) to construct a high-resolution frame buffer with configurations ranging from 140 through 268 bits per pixel. This high capacity allows storage of color, depth, texture, and numerous other special-purpose data fields to support advanced rendering features.

Geometry Subsystem

The Geometry Subsystem is connected to the parallel processing CPU subsystem via a data bus interface. This subsystem receives world coordinate geometric data over the bus, performs specified transformations and lighting computations, and sends the screen-space data to the Scan Conversion Subsystem. The major components of the Geometry Subsystem are the Command Processor and the single-instruction, multiple-data (SIMD)-organized Geometry Engine.

The Command Processor (CP) of the present invention receives command tokens and data from the bus and distributes command packets to the four Geometry Engine modules. The CP accepts coordinate data from the host in four formats: 16-bit integer, 24-bit integer, 32-bit IEEE floating point, and 64-bit IEEE double-precision floating point. Color data is also accepted in packed byte format.

The Command Processor converts all incoming data words to a uniform floating point format regardless of the input representation. In addition, for each 3-dimensional vertex specified, the CP fills in any parameters not supplied by the user. Values from a repository of current values previously specified are used to fill in parameters not supplied. The CP then outputs a complete packet of parameters. An input FIFO buffers data from the host computer, thus eliminating unnecessary protocol overhead.

Geometry Engine

The Geometry Engine (GE) contains four identical floating point processor data paths. Each module, implemented using a 74ACT8867 chip, manufactured by Texas Instruments, Inc., is capable of 32 million floating point operations per second (MFLOPS), giving a peak aggregate rate of 128 MFLOPS. The Geometry Engine processes a stream of high-level graphics commands mixed with single-precision, floating point data. Each GE module includes local memory data. The four modules act together as a SIMD machine under control of a centralized microsequencer, operating on up to four graphic object vertices simultaneously. The Geometry Engine is designed to have a very short latency time for maximum throughput efficiency.

The first Geometry Engine task is to perform matrix operations on incoming vertices. Each Geometry Engine uses a 4×4 matrix stack to rotate, translate, and scale 2D and 3D homogeneous coordinates. A 3×3 normal matrix stack is also used to transform surface normals.

The next Geometry Engine task is to light the vertices. The GE maintains the position, direction, and intensity specifications for lighting calculations. It supports up to eight point-source lights or spotlights; material specifications including ambient, diffuse, and specular reflectance parameters; and lighting model information. The color applied to each transformed vertex is a function of the vertex position, the surface normal direction, the lighting model, the lights, and the characteristics of the surface. The result of the lighting calculation is either a set of eight-bit red, green, blue, and alpha values (in RGB mode) or a single 12-bit color index (in color index mode).

The third Geometry Engine task is to clip coordinates to a 6-plane bounding box. (The ability to clip against additional arbitrary planes is also available.) A fast accept/reject clip-checking algorithm eliminates the need for complex clipping calculations in most cases.

The final steps of the vertex computation are to perform depth-cued color calculations, to clip colors to the required eight-bit range, and to decompose polygons with five or more vertexes into triangular and quadrilateral primitive shapes.

Scan Conversion Subsystem

Screen coordinates sent from the Geometry Engine to the Scan Conversion Subsystem specify points and the vertices of lines and polygons in the screen coordinate space. The Scan Conversion Subsystem performs the calculations required to reduce vertex data to individual pixels. Each pixel is assigned an X, Y screen position, plus a number of parameters per pixel, including Z, red, green, blue, alpha, and texture parameters s and t. These parameters are usually linearly interpolated between vertices and between the edges of polygons.

The task of scan-converting polygons is partitioned into four separate processors within the Scan Conversion Subsystem: the Vertex Reorganizer, the Polygon (Poly) Engine, the Area Engine, and the Span Processor.

Floating point precision is used in the stages up to and including the Poly Engine to maintain coordinate integrity when calculating slopes. The third processor, the Area Engine, maintains this precision in a fixed point format, and maintains fractional coordinate accuracy. All color, depth, and texture components are first corrected to an initial pixel center, then iterated in full-pixel steps. As a result, iterated values remain planar across polygonal surfaces, and subsequent Z-buffer calculations result in clean intersections. Furthermore, maintaining fractional X and Y screen position information for all primitives enables correct multi-pass jittering operations.

The first processor, the Vertex Reorganizer (VR), arranges the stream of commands and floating point data from the Geometry Engine into points, line segments, triangles, or quadrilateral primitives, depending on the command type. The VR sends from one to four primitives on to the next stage, the Poly Engine. In the case of meshes, the VR can distribute up to four triangles to the four Poly Engine modules. The VR also sorts triangle and quadrilateral vertices by their X coordinate to facilitate later computations.

The Poly Engine is a four-module SIMD floating point processor that is nearly identical in structure to the Geometry Engine. The Poly Engine begins the scan conversion process by calculating a number of parameters pertaining to the triangle, such as the edge and parameter values at the leftmost pixel sample covered, and the parameter slopes in the X and Y directions. Cohen-Sutherland clipping, when actually required, is also performed in the Poly Engine. This form of clipping is well known in the art.

The Area Engine (AE) is a set of four fixed-point processor modules under control of a single microprogrammed sequencer. The Area Engine converts floating point initial value and slope information to produce X, Y, and parameter values for individual spans of pixels that lie between the top and bottom edges of a triangle. For each X coordinate covered by the triangle, the AE iterates the pertinent two edges and produces new Y intercepts and exact parameter values along one of the edges. The AE passes this information along with the Y-direction slopes to the Span Processors.

Intercepts and parameter slopes are received by one of five or ten Span Processors. In the basic five span processor configuration of the preferred embodiment, each processor handles one-fifth of the 1280 visible screen columns. Span processor 0 manages columns 0, 5, 10, etc.; Span Processor 1 manages columns 1, 6, 11, etc. Since spans generated from a single polygon are always adjacent, the span processing load is evenly distributed across the five processors. Ten-span systems distribute the load similarly, with each span handling every 10th iteration of pixels.

Each Span Processor iterates from the given starting Y address to the ending Y address, using the slope data to generate Z, color, and texture values in the given column. These values are passed to the Raster Subsystem to be used to update the display.

Raster Subsystem

The Raster subsystem contains 20 or 40 Image Engines, each of which control a portion of the screen in a two-dimensionally interleaved fashion. In the 20-engine configuration, a single Image Engine controls 65,536 screen pixels. Each pixel is composed of at least 144 bits of data, which is stored in frame buffer memory.

The Raster subsystem includes image bit plane memory. This memory stores 32 bits of R, G, B, and Alpha information for each pixel of the 1280×1024 display of the preferred embodiment. The architecture of the preferred embodiment contains two of these buffers (a total of 64 bits) to support either double-buffered 32-bit color (R, G, B, and Alpha) or double-buffered 12-bit color index styles of drawing and displaying.

The Raster subsystem also includes a 24-bit signed Z-buffer. The 24-bit Z coordinate associated with each pixel is stored in the Z-buffer planes. When hidden-surface removal is performed, the Z coordinate of an incoming pixel is compared to the current depth value already stored in the bit planes. If the incoming Z coordinate is closer to the user's viewpoint, and therefore visible, the color value of the new pixel is used to update the image bit planes, and the new Z coordinate value is written into the depth planes at the same location. Conversely, if the incoming Z coordinate is farther from the viewer, the new color value is ignored.

The eight remaining bits in the depth bank are designated as stencil planes. The Image Engines have the ability to conditionally clear, write, increment, and decrement these planes independent of the 24-bit depth value. This capability allows pixels to be tagged as a way of extending the capability of the depth buffer to do a number of prioritizing algorithms.

Texture Planes

One bank of memory is dedicated for storing 65,536 "texels", or texture map elements. Each texel is composed of R, G, B, and Alpha fields just as in the image planes. Based on the s and t texture parameters iterated by the Scan Conversion Subsystem, the Image Engine calculates and looks up elements in a selected texture map. The color data from this map can then be used along with the incoming color value to update the image bitplanes with a textured pixel value.

Display Subsystem

The Display Subsystem receives pixel information from the frame buffer, routes it through the appropriate display mode, and sends it to the Digital-to-Analog Converters for display. Five Multimode Graphics Processors (MGPs) read and interpret the contents of the Image Planes. The graphics system of the present invention displays multiple images simultaneously, in an overlapping window environment, in single-buffered RGB, double-buffered RGB, single-buffered color-index, and double-buffered color-index color modes.

The MGPs allow simultaneous display of up to 16 unique window styles. This allows users to display both static and dynamic images at will, without having to consider the underlying color representation scheme. The MGPs position and draw the user-definable graphics cursor or a full-screen crosshair cursor and incorporate a 64×28 bit auxiliary color look-up table for overlays and underlays.

Linear RGB or mapped color indexed data is read from ten VRAMS in parallel onto the Video Bus. Data is sent via the Video Output Formatter to be displayed. High-speed Digital-to-Analog Converters (DACs) drive the red, green, and blue electron guns of a color display. When the graphics system of the present invention operates in a RGB color mode, the DACs receive up to 24 bits of color information for each pixel. Eight of these bits are directly assigned to each of the red, green, and blue DACs thereby yielding more than 16 million colors. The DACs are multiplexed to handle the input from the five parallel sources. In color-index mode, pixel data packets are used as indices into a 12-bit-in and 24-bit-out color map before being sent to the DACs. The pixel-mapping feature of the color-index mode allows screen colors to be quickly modified by simply changing the values stored in the color maps. The graphics system of the present invention also provides the capability to output the contents of an alpha buffer. The alpha buffer is useful for video applications including compositing, which require coverage information on a per pixel basis to blend different images together in the same scene.

Texture Mapping

Computer graphics displays are greatly enhanced with the use of texture mapping. Texture mapping has traditionally been used in fields such as visual simulation and computer animation to enhance scene realism. The graphic system of the present invention provides high-quality texture mapping of geometric surfaces at interactive rates. A texture is a function defined in texture space that is warped, or mapped, by a specified mapping into an object space. Textures can be used to add vegetation and trees to barren terrain models without adding geometric complexity. Labels can be applied on computer-modeled package designs to get a better appreciation of how actual products will look. In addition to scene realism, interactive texturing also facilitates visualization of user data. Patterns mapped on to geometric surfaces can provide additional motion and spatial cues that surface shading alone cannot provide. For example, a sphere rotating about its center appears static when displayed as a shaded surface; however, by affixing a pattern to the sphere, its motion is easily detected. In fields such as scientific visualization, it is desirable to display changing properties of an object on its surface. Interactively texturing a surface as a function of these changing properties is an excellent way to accurately visualize this information.

Although the texture function, or texture for short, can be an arbitrarily dimensioned array of data, this preferred embodiment discloses the use of 2D images, the most commonly used textures. Similarly, the preferred embodiment describes mappings only onto geometric primitives in 3D space, namely polygons, lines, and points.

Architecture

Interactive texture mapping is achieved on the graphics hardware of the present invention with a balanced pipeline architecture. Most of the texture computations occur during the rasterization process. Texture coordinates are carried through the pipe with each vertex. During the scan conversion process, texture coordinates are iterated with the other polygon parameters at each screen pixel. The twenty or forty parallel Image Engines (IE) simultaneously texture a polygon and blend it into the display. Since IEs are fully programmable, a variety of texture mapping algorithms can be implemented in the architecture. Texture memory contention is eliminated by giving each Image Engine its own copy of the texture map. Image Engine memory usage is flexible; up to 640K-bytes in each Image Engine can be dedicated to texture storage. Textures as large as 256×256 RGBA pixels can be applied to geometry in one pass, and textures up to 32K×32K are supported by the hardware of the preferred embodiment using a multi-pass technique.

A variety of texture types and environments are provided to support the diverse applications of textures. Textures can be monochrome or color, with alpha or without. Texture alpha can be used to make a polygon's opacity vary at each pixel. For instance, when an RGBA image of a tree is mapped onto a quadrilateral, objects behind the polygon can appear through the polygon whereever the opacity of the tree map is low, thereby creating the illusion of an actual tree.

Textures can be combined with their surfaces in a variety of ways. A monochrome texture can be used to blend between the surface color and a constant color to create effects such as grass on dirt or realistic asphalt. By adding alpha, a texture can be used to create translucent clouds. Textures can also be used to modulate a surface's color or be applied as a decal over a surface.

The present invention can automatically generate texture coordinates, based on user-specified behavior. This feature can be used to texture map contours onto an object without requiring the user to compute or store texture coordinates for the object.

The basic steps of the texture mapping process are:

1. Texture coordinates are assigned to vertices of an object to define a mapping from texture space to geometry in object space.

2. Next, a texture function is chosen to produce texture values from the interpolated texture coordinates.

3. Finally, the texture environment determines final color from input values produced by shading and the texture function.

Texture Coordinates

Figure 2:
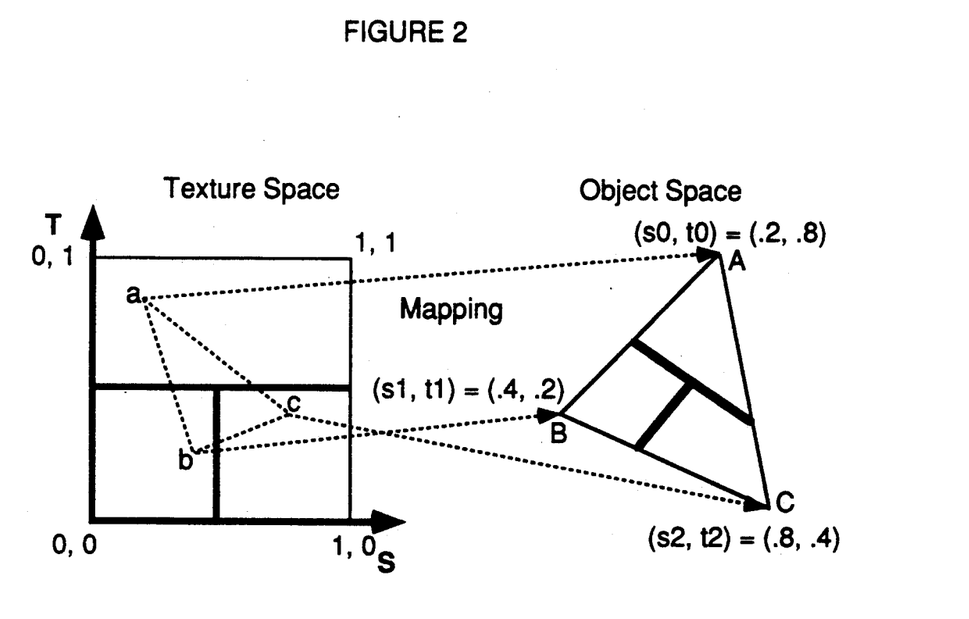
FIG. 2 illustrates how to map textures onto a geometry using texture coordinates.

FIG. 2 illustrates how to map textures onto a geometry using texture coordinates and how texture coordinates are generated at screen pixels. Referring to FIG. 2, coordinate axes s and t define a 2D texture space. By definition, a texture lies in the range 0 to 1 along both axes. Coordinate pairs (s,t), which are not necessarily limited to this range, are used to index the texture.

To define a mapping, texture coordinates (a,b,c) are assigned to the vertices of a geometric primitive (A,B,C); this process is call parameterization. FIG. 2 shows a parameterized triangle and how the parameterization defines the mapping between coordinate systems.

Next, the current texture matrix transforms the texture coordinates. This matrix is a standard 2D transformation matrix. Thus, the (s,t) pair is treated as a 2D point and is transformed accordingly.

The final step generates s and t at every pixel center inside a geometric primitive by interpolating between the vertex texture coordinates during the scan conversion process. Many prior art graphic systems use hardware to linearly interpolate texture coordinates.

Figure 3A:
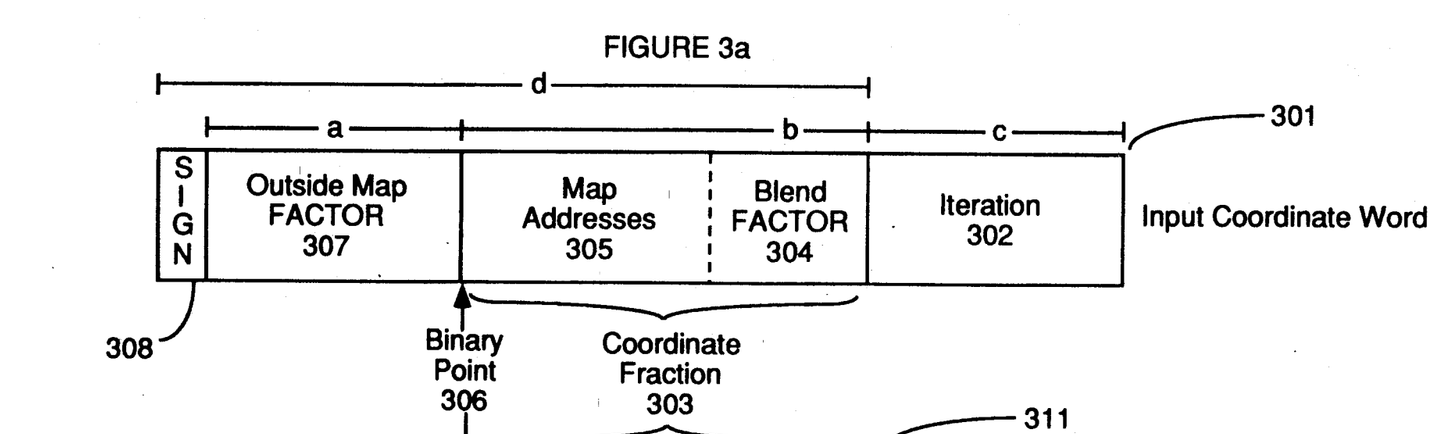
FIGS. 3a and 3b illustrate the fields in a texture input and output coordinate.

Referring now to FIG. 3a, the field definitions within an input texture map coordinate 301 are illustrated. Such a texture map coordinate 301 is used to define s or t positions within a texture map. One coordinate is associated with the s direction; another coordinate is associated with the t direction. Several fields are provided within each texture coordinate 301. An iteration field 302 is used to maintain fractional accuracy in positioning texture coordinates as they are iterated across a surface. The coordinate fraction field 303 defines a location associated with a particular texel with a texture map. Since a texture map is defined as a coordinate region from zero to one, coordinate fraction 303 defines a fractional value. Thus, the binary point 306 for the coordinate 301 is located just above the highest order bit of the coordinate fraction field 303. Field 305 represents actual texture map address bits. Field 304 represents fractional address bits; it is used to blend the value of texels at adjacent addresses. Fields 304 and 305 can be adjusted in length, thereby providing a means for variably scaling the accuracy and storage requirements of the applied texture. Values stored to the left of binary point 306 represent integer values outside the defined range of a texture map. Thus, a field called outside map factor 307 is defined at a position to the left of the binary point as shown in FIG. 3a. Field 307 is used to support clamping and a multi-pass technique for tiling large texture maps. This field expands the address space of textures beyond the zero to one coordinate range stored in a hardware texture map. A sign bit 308 completes the field definition for coordinate 301 by indicating a negative or positive coordinate value.

Figure 3B:
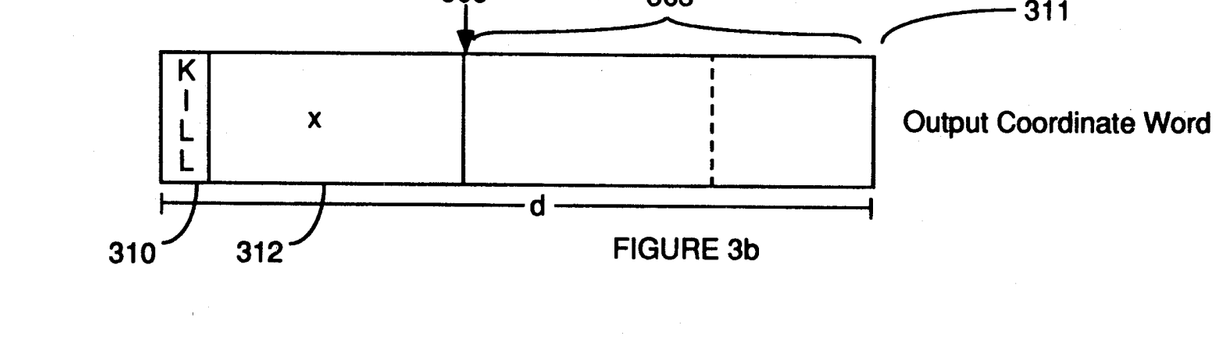

In the preferred embodiment of the present invention, the length (d) as shown in FIGS. 3a and 3b represents a 24 bit value. The length (b) of coordinate fraction 303 is 16 bits in the preferred embodiment. The length (a) of the outside map factor field 307 is seven bits in the preferred embodiment and iteration field 302 is 12 bits wide (length c) in the preferred embodiment. It will be apparent to those skilled in the art that other field widths may be defined and used without departing from the scope of the present invention.

Figure 1:
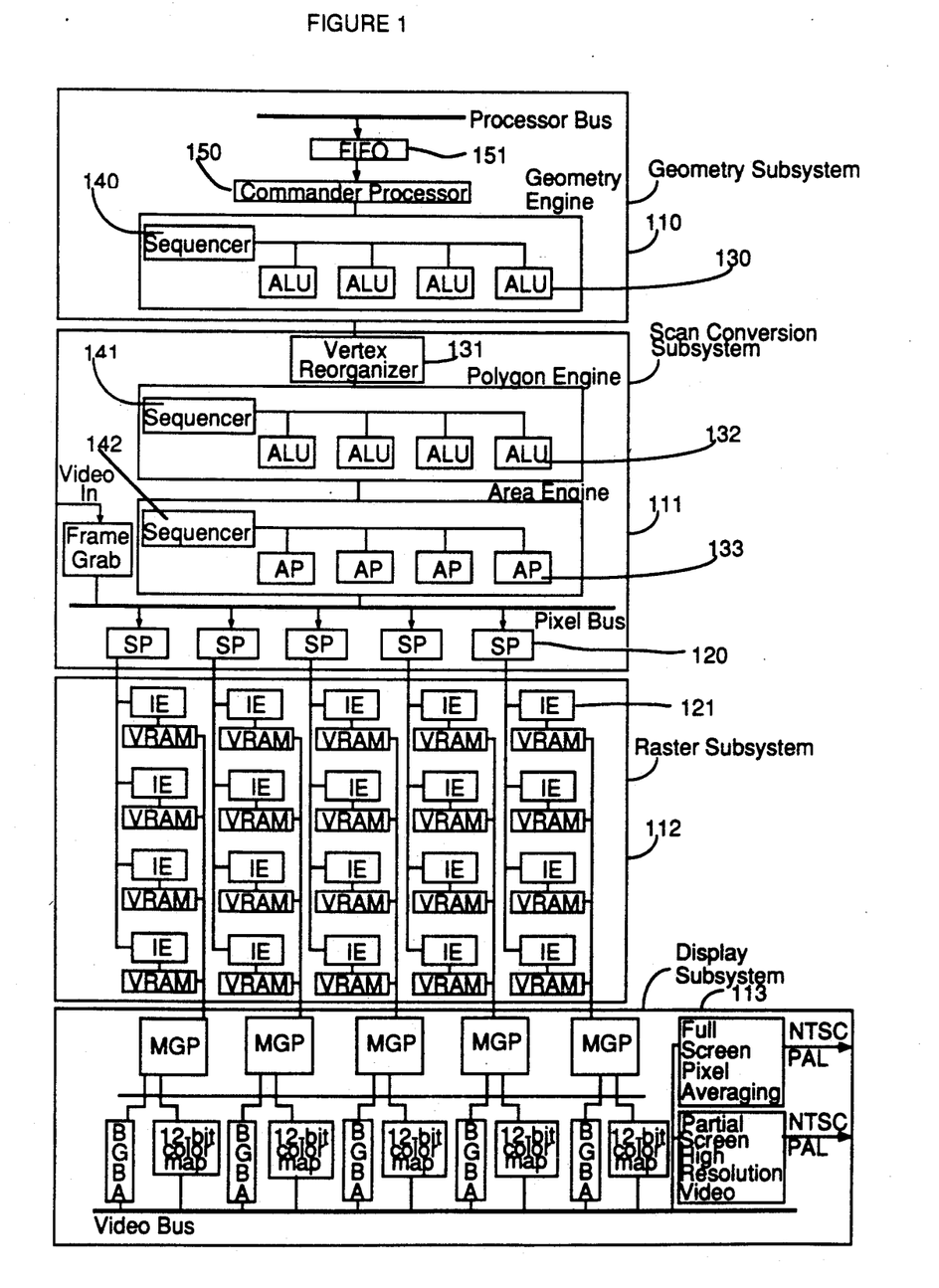
FIG. 1 is a block diagram illustrating the major components of the hardware of the present invention.

Texture coordinates 301 such as those depicted in FIG. 3b are processed by the Span Processors (SP) 120 as shown in FIG. 1. Once processing by the SPs has been completed, the most significant 24 bits of the coordinate are passed to one of a plurality of Image Engines 121 after being manipulated by a Span Processor. The output coordinate 311 passed to an Image Engine 121 is illustrated in FIG. 3b.

Using the architecture described above, a means for applying texture to pixels that are outside the range of a texture map can be implemented in each of the span processors 120. Each span processor 120 provides three display modes for pixels outside the range of a texture map. The first mode is the prior art repeat mode. In repeat mode, the texture for an out of range pixel is repeated in either the s or t directions independently. In this mode, the span processor 120 is not required to perform any special processing. Instead, the texture coordinate is passed unmodified to one of the plurality of image engines 121.

The second and third texture mapping modes improve over the prior art by providing a means for controlling texture mapping of pixels outside the range of the texture map. The second texture mapping mode provided by the present invention allows pixels outside the range of the texture map to be set to a value corresponding to pixels on a corresponding border of the texture map. The border texture values are thus smeared across the pixels outside the texture map range. This mode, called clamping, allows out of range pixels to be set to a border texture value thereby preventing the repetition of the texture map pattern over the out of range pixels.

The third texture mapping mode provided by the present invention allows a particular s,t texture coordinate range to be enabled for texturing. Pixels outside the selected coordinate range are not modified by texture processing. In this way, a particular region of an image can be targeted for texturing while texturing of areas outside the selected region is suppressed. This third mode, called select mode, is particularly useful for applying decals to an existing image. Select mode allows the representation of an image n times larger than the storable texture size.

Figure 4:
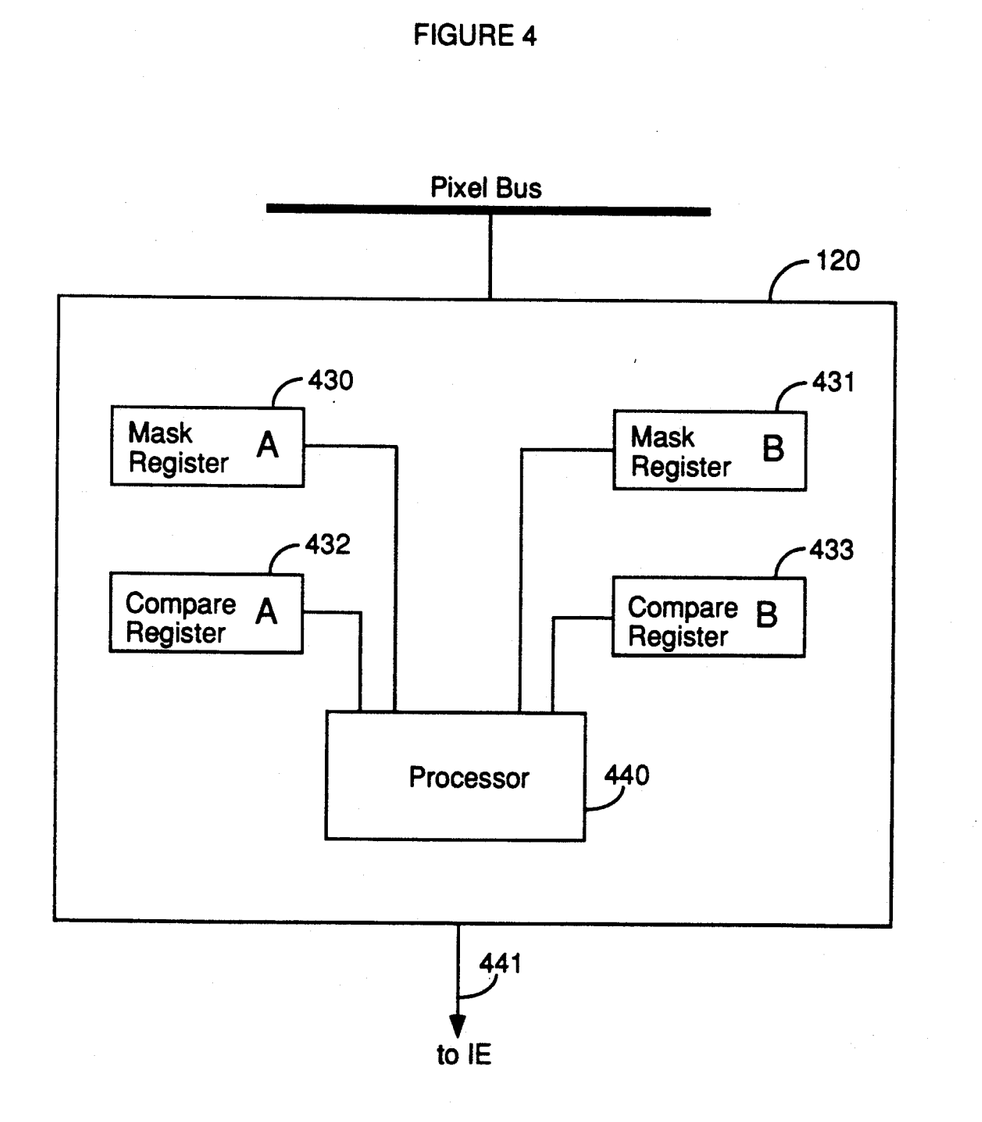
FIG. 4 illustrates the internal registers of a Span Processor.

The clamping and select texture modes of the present invention are implemented by special hardware in each span processor 120 and processing logic executing within a processor in each span processor 120. Referring now to FIG. 4, the internal hardware of each span processor 120 is depicted. Span processor 120 includes mask registers 430 and 431 and compare registers 432 and 433. Mask registers 430 and 431 are provided to adjust the size of the address space extending beyond the space of the stored texture map. By masking off bits of the outside map factor field 307, the address space may be so adjusted. Compare registers 432 and 433 are provided to specify a select address range in select mode. Processor 140 is provided for executing microcode within span processor 120. Mask register 430 and compare register 432 are used by the processing logic of the present invention for manipulating the s component of a texture coordinate. Mask register 431 and compare register 433 are used by the processing logic for manipulating the t component of a texture coordinate. These registers are used by the processing logic within a span processor 120 as described below.

Logic of the Present Invention

Figure 5A:
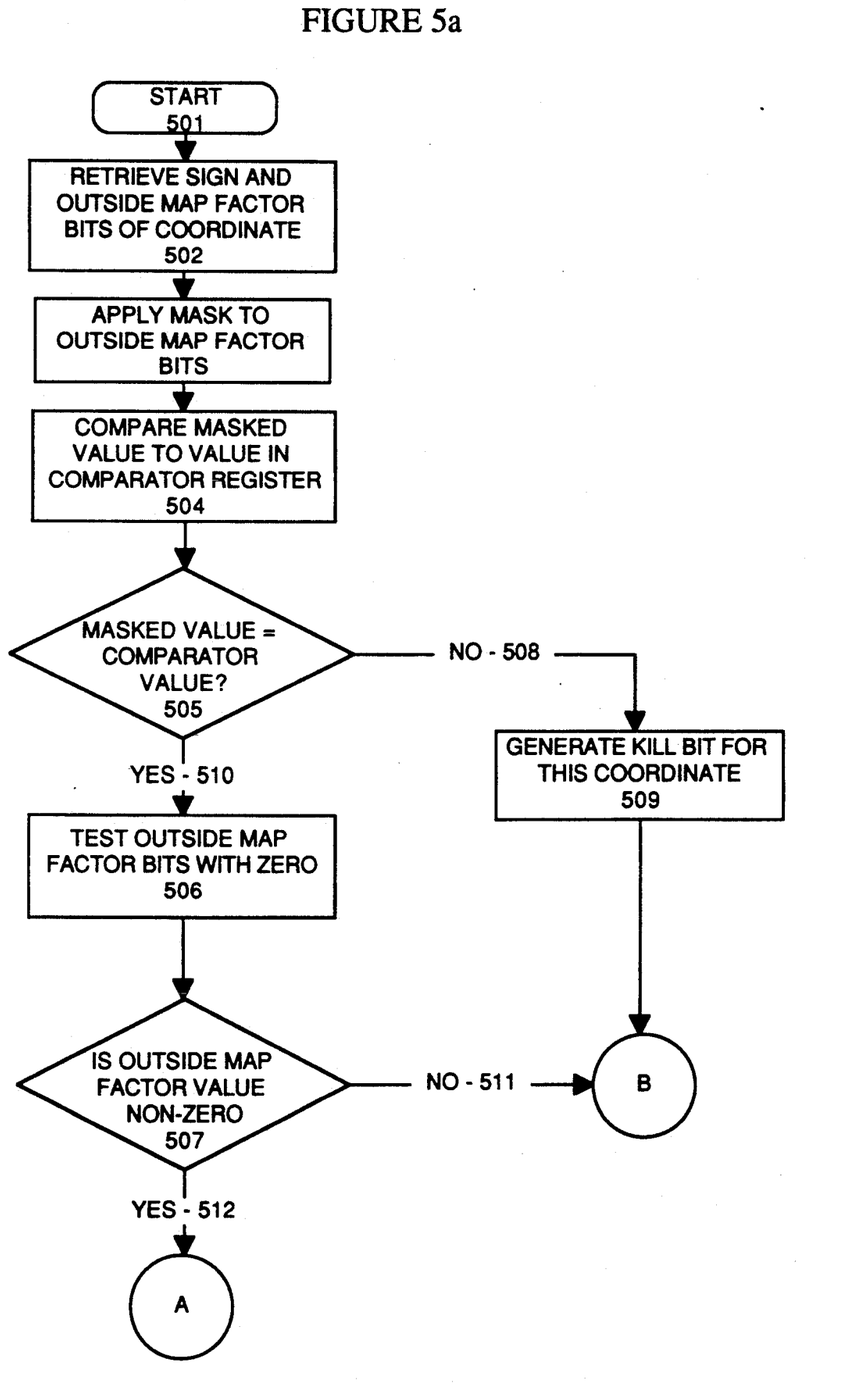
FIGS. 5a and 5b are flow charts of the logic of the present invention.
Figure 5B:
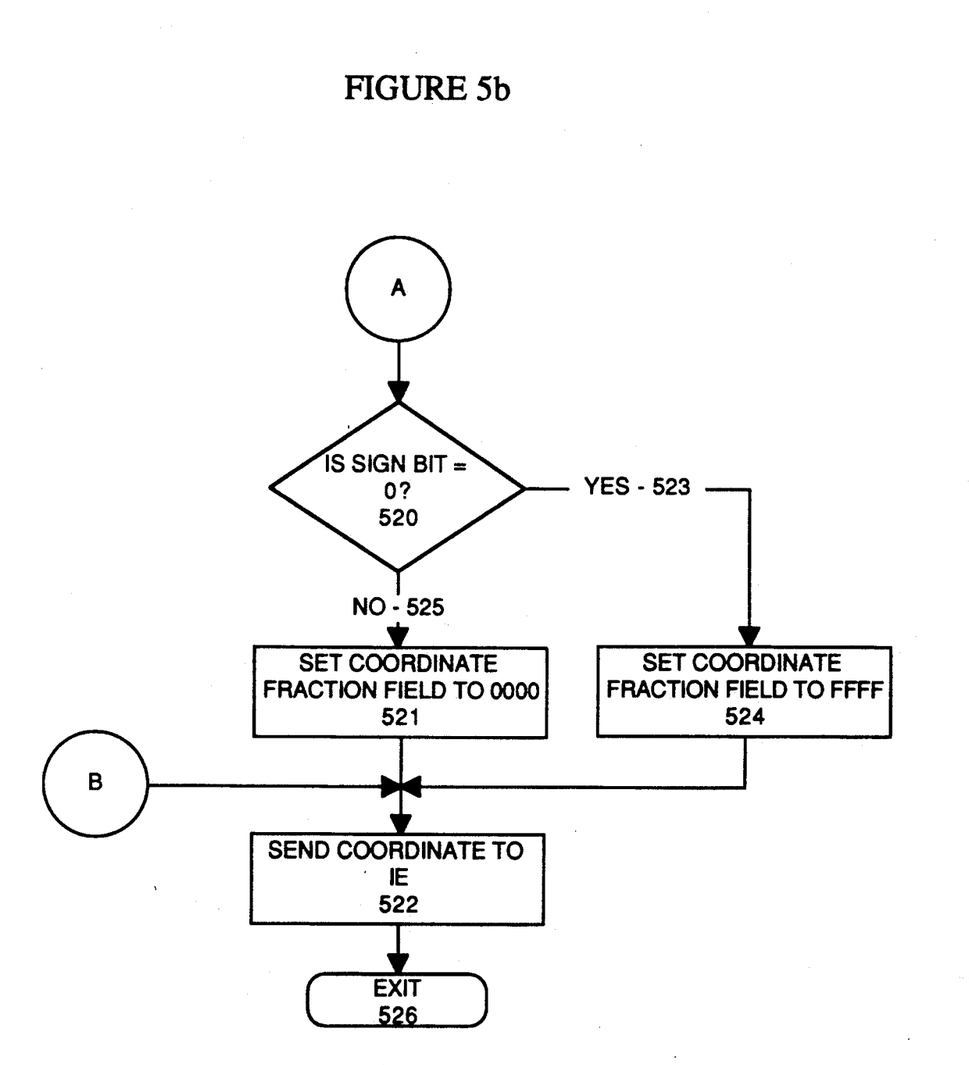

Referring to FIGS. 5a and 5b, flow charts are employed to best illustrate the processing logic used to implement the display modes of the present invention. This processing logic is embodied within microcode in the span processors 120 of the scan conversion subsystem 111. As display objects are decomposed into individual pixels by the polygon engine and the area engine, individual pixel coordinates are supplied to each span processor 120 and provided as input to the processing logic contained therein. Span processor 120 microcode controls the activation of the logic illustrated in FIGS. 5a and 5b. Once activated, this processing logic begins execution starting at a bubble labeled start 501 illustrated in FIG. 5a. The input coordinate, of a form similar to that described in relation to FIG. 3a, is retrieved. The outside map factor field and the sign bit of the input coordinate is obtained at processing block 502. Next, a mask value is obtained from mask register A (430) or mask register B (431). Mask register A is used for an s direction coordinate. Mask register B is used for a t direction coordinate. The mask value thus obtained is applied to the value obtained from the outside map factor field. These two values are anded together to produce a masked value (processing block 503). A comparison value is retrieved from compare register A (432) or compare register B (433). Compare register A is used for s direction coordinates and compare register B is used for t direction coordinates. The compare value obtained from a compare register is tested against the masked value produced in processing block 503. The result of this test determines whether or not an input coordinate is within a particular s,t coordinate range in which texturing is enabled. If the masked input coordinate is not equal to the value stored in a compare register (decision path 508), the input coordinate is not within a selected s,t coordinate range. It is thus necessary in this case to suppress the drawing of the textured pixel at this coordinate. Texture suppression is performed by generating a kill bit 310 for this coordinate (processing block 509) in the coordinate output word. The coordinate output word 311 is illustrated in FIG. 3b. The kill bit 310 acts as a texture supression indication. The kill bit 310 is generated by setting the sign bit of the 24 bit coordinate output word. Processing then continues at the bubble labeled B as shown in FIG. 5b.

Referring now to FIG. 5b, the coordinate output word with a kill bit indicated in the sign bit position is output to an image engine at processing block 522. The image engine uses the kill bit indication to suppress the application of texture associated with the output coordinate. Processing for the present invention within span processor 120 then terminates at the bubble labeled exit 526 as illustrated in FIG. 5b. Referring again to FIG. 5a, at decision block 505, decision 510 is taken if the masked value is equal to the value retrieved from a compare register. In this case, the input coordinate is within a selected texture coordinate range. At processing block 506, the input coordinate outside map factor bits 307 are tested with zero. If the outside map factor value is equal to zero, processing path 511 is taken to the bubble labeled B as shown in FIG. 5b where the coordinate is sent on to an image engine (processing block 522). If, however, the outside map factor is non-zero (processing path 512), processing continues at the bubble labeled A as illustrated in FIG. 5b. In this case, the input coordinate is located at a position outside the range of a texture map. In this case, clamping logic is used to determine how to apply a texture to a pixel outside of the texture map coordinate range. Referring now to FIG. 5b at decision block 520, the sign bit of the input coordinate is tested for zero. If the sign bit of the coordinate is equal to zero, a positive coordinate value is present. The positive coordinate value combined with the non-zero outside map factor value indicates that the input coordinate is located beyond the positive range of the texture map. In this case, the coordinate fraction field of the input coordinate is set to a value corresponding to the most positive address value of the texture map. In the preferred embodiment, this most positive address value corresponds to all ones (i.e. a value of FFFF in hexidecimal) (processing block 524). This action of setting the coordinate field to all ones operates to clamp the texture value of the out of range pixel to the value stored at the most positive border of the texture map. Once this clamping has occurred, the coordinate is sent to the image engine at processing block 522. Referring again to decision block 520, processing path 525 is taken if the input coordinate is negative. In this case, the input pixel is located beyond the least positive or zero border of the texture map. The coordinate fraction field of the input coordinate is therefore set to all zeros (processing block 521). The negative input coordinate is thereby clamped to the zero border of the texture map. The coordinate is then sent to the image engine at processing block 522. Processing for the present invention then terminates at the bubble labeled Exit 526 as shown in FIG. 5b.

Figure 6:
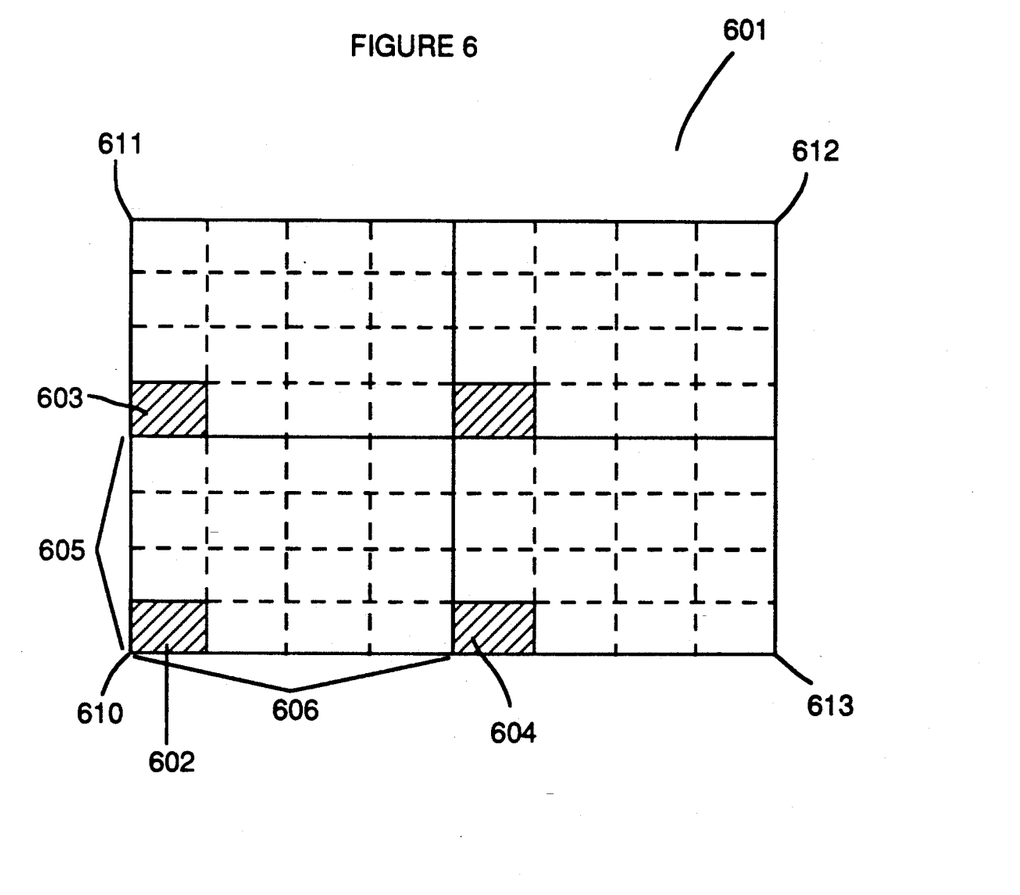
FIG. 6 is an example of a texture space comprising multiple sets of texture maps.

The present invention is particularly useful for manipulating a texture space comprising multiple sets of texture maps. Such a multiple map configuration is denoted "tiling". An example of tiling is illustrated in FIG. 6. Referring to FIG. 6, a texture space 601 is illustrated. Texture space 601 is made up of individual texture maps (i.e. tiles), such as texture map 602. Each individual texture map 602 defines point texture (i.e. texels) within the boundary of the map 602. The boundaries of each texture map 602 are defined by the number of data bits provided in the coordinate fraction field 303 of a texture coordinate. As described above, these boundaries define a coordinate ranging from 0 to 1.

In order to access texture space outside of a particular texture map 602, some means for extending the addressable range of a texture coordinate must be provided. The present invention provides this means, thereby allowing access to the entire texture space 601. The select mode of the present invention is particularly useful for this purpose. Referring again to the example shown in FIG. 6, borders 603 and 604 define a rectangular region 610 of texture space in which four rows 605 and four columns 606 of individual texture maps 602 are contained. Three other rectangular regions 611, 612, and 613 of a configuration identical to rectangular region 610 are adjacently included to complete the texture space 601 of the example in FIG. 6. Rectangular regions 611, 612, and 613 are repetitions of the space within rectangular region 610. Thus, a texture coordinate defined in map 602 may be repeated in regions 611, 612, and 613.

The outside map factor field 307 in the texture coordinate of the present invention can be used to define the dimension of a rectangular region and to access one of the rows or columns of a rectangular region of texture space. Since the example of FIG. 6 has four rows or four columns, two bits in the outside map factor field 307 can be used to define one of four rows or one of four columns. It will be apparent to those skilled in the art that a greater or lesser number of bits may be used to define a texture space of a greater or lesser dimension. If two bits in the outside map factor field 307 are used to specify one of four rows or columns of texture maps, the masks contained in mask registers 430 and 431 are used to masks off bits of the outside map factor field 307 other than the least two significant bits. In this manner, the masks can be used to adjust the dimension of a rectangular region texture space in increments of powers of two. Thereafter, the compare registers 432 and 433 can be used to specify a particular map row or column.

To support blending of textures between multiple texture maps, the Image Engine of the present invention stores each texture map as an [m+2] by [n+2] texture array where m and n represent the number of texels in a row and a column of the texture map. The additional texels allow storage of neighboring texture map samples on all sides of the texture map. These samples may be neighbor texture map values or a border value. By storing neighbor samples, adjacent texture maps in a texture space may be blended together without creating a seam between maps.

It will be apparent to those skilled in the art that the clamping and select modes of texture mapping may be equally applied to an embodiment employing multiple component texture maps. In these systems, a plurality of texture maps are used for applying texture to input pixels. It will also be apparent to those skilled in the art that the clamping mode and the select mode of the present invention are independent modes. The two modes need not be implemented together in a single system. Either mode may be implemented as taught herein without requiring implementation of the other mode.

Thus, a means and a method for specifying and controlling a display range in which a specified form of texture mapping is applied or suppressed.

Although the invention has been described herein with reference to a specific embodiment, many modifications and variations therein will readily occur to those skilled in the art. Accordingly, all such variations and modifications are included within the intended scope of the present invention as defined in the following claims.

We claim:

1. A graphical display system for visibly displaying textured objects, comprising:
   means for receiving an input texture map coordinate;
   means for storing a selected texture map coordinate range;
   means for determining if said input coordinate is within said selected coordinate range;
   means for applying a texture for said input coordinate if said coordinate is within said selected coordinate range.
   means for suppressing application of a texture for said input coordinate if said coordinate is not within said selected coordinate range.

2. The graphical display system as claimed in claim 1 wherein said means for storing a selected coordinate range includes a comparison register for retaining a value defining a selected coordinate range.

3. The graphical display system as claimed in claim 1 wherein said means for determining includes a mask register for retaining a mask.

4. The graphical display system as claimed in claim 1 wherein said means for determining includes:
   a mask register for storing a mask; and
   means for applying said mask to said input coordinate thereby producing a masked input coordinate.

5. The graphical display system as claimed in claim 4 wherein said means for determining further includes:
   means for comparing said masked input coordinate with said selected coordinate range.

6. The graphical display system as claimed in claim 1 wherein said means for suppressing includes means for generating a texture supression indication associated with said input coordinate.

7. A graphical display system for visibly displaying textured objects, comprising:
   means for receiving an input texture map coordinate;
   means for indicating a texture map range;
   means for determining if said input coordinate is within said texture map range; and
   means for setting said input coordinate to a predetermined value independent of said input coordinate if said coordinate is not within said texture map range.

8. The graphical display system as claimed in claim 7 wherein said means for determining further includes means for assigning a bit field within said input coordinate, said bit field indicating if said input coordinate is outside said texture map range.

9. The graphical display system as claimed in claim 7 wherein said means for determining further includes means for testing if said input coordinate is positive or negative.

10. The graphical display system as claimed in claim 7 wherein said means for setting said input coordinate to a predetermined value further includes:
    means for setting said input coordinate to a value corresponding to a most positive border of a texture map if said input coordinate is positive.

11. The graphical display system as claimed in claim 7 wherein said means for setting said input coordinate to a predetermined value further includes:
    means for setting said input coordinate to a value corresponding to a least positive border of a texture map if said input coordinate is negative.

12. In a graphical display system, a process for visibly displaying textured objects, comprising the steps of:
    receiving an input texture map coordinate;
    storing a selected texture map coordinate range;
    determining if said input coordinate is within said selected coordinate range;
    applying a texture for said input coordinate if said coordinate is within said selected coordinate range;
    suppressing application of a texture for said input coordinate if said coordinate is not within said selected coordinate range.

13. The process as claimed in claim 12 wherein said determining step further includes the steps of:
    retaining a mask; and
    applying said mask to said input coordinate thereby producing a masked input coordinate.

14. The process as claimed in claim 13 wherein said determining step further includes the step of:
    comparing said masked input coordinate with said selected coordinate range.

15. The process as claimed in claim 12 wherein said suppressing step further includes the step of generating a texture supression indication associated with said input coordinate.

16. A process for visibly displaying textured objects, comprising the steps of:
    receiving an input texture map coordinate;
    indicating a texture map range;
    determining if said input coordinate is within said texture map range; and
    setting said input coordinate to a predetermined value independent of said input coordinate if said coordinate is not within said texture map range.

17. The process as claimed in claim 16 wherein said determining step further includes the step of assigning a bit field within said input coordinate, said bit field indicating if said input coordinate is outside said texture map range.

18. The process as claimed in claim 16 wherein said determining step further includes the step of testing if said input coordinate is positive or negative.

19. The process as claimed in claim 16 wherein said step of setting said input coordinate to a predetermined value further includes the step of:

setting said input coordinate to a value corresponding to a most positive border of a texture map if said input coordinate is positive.

20. The process as claimed in claim 16 wherein said step of setting said input coordinate to a predetermined value further includes the step of:

setting said input coordinate to a value corresponding to a least positive border of a texture map if said input coordinate is negative.

21. The process as claimed in claim 12 wherein said selected coordinate range defines a particular row of individual texture maps in a multiple map texture space.

22. The process as claimed in claim 12 wherein said selected coordinate range defines a particular column of individual texture maps in a multiple map texture space.

* * * * *